May 8, 1962

J. PFAU 3,033,971

ELECTRIC CIRCUITS ADAPTED TO EQUIP A MACHINE
FOR MACHINING BY SPARKS

Filed April 9, 1958

United States Patent Office 3,033,971
Patented May 8, 1962

3,033,971
ELECTRIC CIRCUITS ADAPTED TO EQUIP A MACHINE FOR MACHINING BY SPARKS
Jean Pfau, Geneva, Switzerland, assignor, by mesne assignments, to Elox Corporation of Michigan, Troy, Mich., a corporation of Michigan
Filed Apr. 9, 1958, Ser. No. 727,300
Claims priority, application Switzerland Apr. 10, 1957
6 Claims. (Cl. 219—69)

Different electric circuits are already known adapted to equip machines for machining by sparks. Said circuits permit of producing electric discharges by repeated sparks between an electrode-tool and a part to be machined, and each discharge produces a small excavation in the part to be machined. The size of each excavation depends on the energy of the discharge, and when it is desired to obtain a precise and fine machining, it is necessary to maintain the energy of each discharge at a relatively low value. In order, nevertheless, to obtain a sufficient speed of machining, it becomes necessary to increase the frequency of the discharges as much as possible.

The most simple known circuits for electro-erosion are constituted by an electrostatic accumulator which is connected by a charging circuit to a source of direct current, said accumulator being connected directly to an electrode-tool and to the part to be machined. Said circuits utilise the switching property provided by the assembly constituted by the electrode, the part to be machined and the dielectric which is located between these two. In fact, when applying to such an assembly, a progressively increasing voltage, nothing happens at the start, but when said voltage reaches the disruptive value of the dielectric, a discharge is struck between the electrode and the part, said discharge having been produced effectively by the action of switching of the assembly. Said circuits have the great advantage of simplicity and flexibility and they do not comprise delicate and expensive electric elements, such as electronic tubes, for example.

On the contrary, said circuits, which in fact are relaxation impulse generators, have a disadvantage, because the voltage of the electrostatic accumulator is applied between the electrode and the part during the period of recharging the accumulator. As a result a serious limitation of the maximum possible frequency of the discharges results, as in order to obtain a high frequency, it is necessary to provide a very rapid recharging of the electrostatic accumulator and, the voltage of said latter being applied between the electrode and the part, there results a strong tendency to the establishment of a continuous arc. When the discharges degenerate into a continuous arc, there is produced a short-circuit which most frequency involves very serious damage to the machined surfaces.

Endeavours have been made to remedy said disadvantages by using generating circuits for impulses which contain an element acting as a closing switch, so that the switching property of the electrode-dielectric-part is not used. In this manner the voltage between the electrode and the part is only applied between the electrode and the part for a brief instant before the discharges, which permits of obtaining very high frequencies of discharge. Unfortunately these circuits are expensive, as they comprise high power electronic elements which are fragile and of which the life is limited. Further, said circuits lack versatility, as the electronic generators only function correctly for a limited range of energy of the impulses. It is therefore not possible to use the same circuit for rough machinings, in which each discharge dissipates a considerable energy, and for medium or even fine machining, for which each discharge should only dissipate a little energy.

On the other hand, it is known that passive elements, particularly saturable self-induction coils, can be used for acting as switches or circuit breakers. Impulse circuits are known which are based on this property of self-saturating coils, but these circuits require either a source of high frequency alternating current, or a source of current by impulses, the frequency of said current being equal to that of the discharges. When it is desired to obtain frequencies above 10 kHz., which are usual in electro-erosion for average and fine machinings, the source of alternating current or of impulse current should include also electronic elements and thus presents the inconveniences referred to above.

The present invention has for its subject an electric circuit adapted to equip a machine for machining by sparks, comprising an electrostatic accumulator connected, on the one hand, to a source of current by a charging circuit and, on the other hand, to an electrode-tool and to the part to be machined by a discharge circuit, in such a manner as to restore rapidly, in the form of a spark between the electrode and the part to be machined, at least a portion of the energy supplied by the source of current. This circuit permits of obtaining the advantages normal to relaxation generator circuits and to impulse generator circuits, without the disadvantage inherent to all of these. In other words, the circuit according to the invention, whilst being of great simplicity, permits of obtaining frequencies of discharges much higher than relaxation circuits, whilst retaining the flexibility which characterises said latter. Said circuit is characterised, in combination, by the fact that the source of current is a source of direct current, that a saturable self-induction coil is arranged in series in the discharge circuit and that the latter has a self-induction sufficient relatively to its ohmic resistance such that the discharge of the electrostatic accumulator has an oscillating character when the self-induction coil is saturated, in such a manner that at the moment of the discharge, an inversion of the voltage of the electrostatic accumulator is produced, said inversion having the purpose of bringing said coil into its unsaturated range, said coil then acting as a circuit breaker, the following discharge being struck by the normal effect of switching of the assembly constituted by the electrode, the part, and the dielectric which separates them.

A number of forms and modifications of the circuit forming the subject of the invention are shown diagrammatically and by way of example in the accompanying drawings, wherein.

Figure 4:
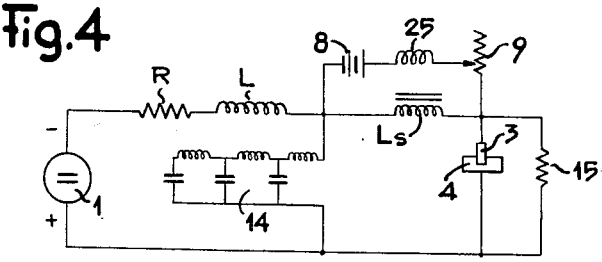

FIG. 4 relates to a second form of construction of the circuit forming the subject of the invention.

Figure 1:
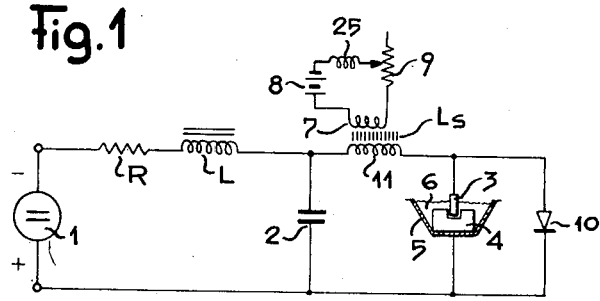
FIG. 1 is a diagram of a circuit according to a first form of construction.

The circuit shown in FIG. 1 comprises a source of direct current 1 adapted to charge an electrostaic accumulator constituted by a condenser 2, by means of a charging circuit comprising a resistance R and a self-induction coil L. The condenser 2 is connected by a discharge circuit to an electrode-tool 3 and a part 4 to be machined which is plunged into a vat 5 filled with a dielectric liquid 6, such as petrol. A saturable self-induction coil Ls is branched in series in the discharge circuit in such a manner as to be traversed by the current delivered by the condenser 2 for supplying the sparks between the electrode 3 and the part 4. The magnetic core of said coil Ls may be subjected to a magnetic polarization by means of an auxiliary winding 7 connected to an auxiliary source of current 8, through the medium of a variable resistance 9 and a filter choke 25. A conductor element, constituted by a rectifier 10, is branched between the electrode-tool 3 and the part 4 to be machined.

Figure 2:
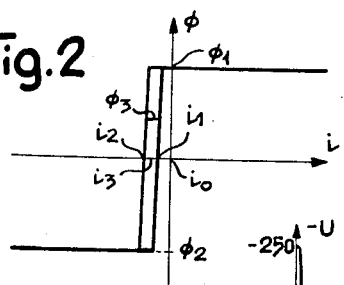
FIG. 2 shows the diagram on the magnetic flux in function of the current of a saturable self-induction employed in the circuit according to FIG. 1.

FIG. 2 shows the magnetisation characteristic of the saturable coil Ls and shows that said characteristic has a substantially rectangular path which, for example, may be obtained by the use of magnetic sheets such as those indicated in the trade by the trademarks "Deltamax," "H.C.R.," "Hyperm 50T." The coil Ls may have a core of annular shape, constituted by a band of magnetic sheet iron wound up on itself. The said self-induction coil Ls may also be constituted with a core of ferrite. The saturable self-induction coil may also be constituted by an annular core simply surrounding the conductor.

It will be seen that the variation of the flux $\phi$ is very considerable when the current is substantially equal at $i_1$ or $i_2$, whilst the flux remains substantially constant and equal to $\phi_1$ when the current is greater than $i_1$, or equal to $\phi_2$ when the current is smaller than $i_2$. The fluxes $\phi_1$ and $\phi_2$ are equal, but the signs contrary. In FIG. 2 the currents $i_1$ and $i_2$ are not located symmetrically relatively to $i_0$, as it is assumed that the auxiliary winding 7 is traversed by a current of polarization acting on the saturation curve in the same manner as a current $i_3$ which will pass through the principal winding 11 of the saturable self-induction coil Ls. As a result the coefficient of self-induction of the induction coil is very large when the current is substantially equal to $i_1$ or to $i_2$, but becomes very small when the current has another value. It is to be observed that, by reason of this polarization, the hysteresis cycle may be traversed without having recourse to a reversal of the direction of the current in the discharge circuit.

Figure 3:
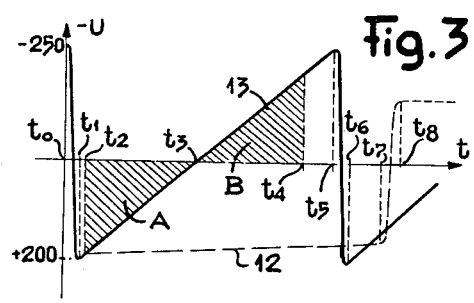
FIG. 3 shows the voltage to the terminals of the electrostatic accumulator as a function of time.

FIG. 3 shows the voltage to the terminals of the condenser 2 as a function of time. It is assumed that at the time $t_0$, the condenser was charged to a voltage equal to the disruptive voltage between the electrode 3 and the part 4, for example 250 volts, so that a spark passes whilst an intense current and of short duration, passes between the electrode 3 and the part 4. During said discharge, the electrode 3 is negative relatively to the part 4 to be machined. The discharge current is located, in FIG. 2, to the right of $i_0$, so that the coefficient of self-induction of the self-induction Ls is very weak. The total self-induction coefficient of the discharge circuit, which is constituted by the sum of the coefficient of the natural self-induction of said circuit and of that of the coil Ls in the saturated state, is selected sufficiently large relatively to the ohmic resistance of the discharge circuit so that the discharge of the condenser 2 has an oscillating character. As a result there is produced an inversion of the voltage at the terminals of the condenser during the discharge, a voltage which may reach 200 v. The inverse maximum charge is reached at the time $t_1$.

If the value of the self-induction Ls were constant, a new discharge of the condenser would be made with a current inversely to that of the first discharge effected between $t_0$ and $t_1$. In fact, FIG. 3 shows that this discharge is primed, but when the current has reached a value $i_2$, it is slowed down to the extreme. In fact, FIG. 2 shows that the curve of saturation presents a sudden bend when the current reaches the value $i_2$, so that the coefficient of self-induction of the coil Ls becomes very large. It thus results that the discharge current is blocked at this value $i_2$ and that, if it is assumed that the source of current 1 is disconnected, the voltage at the terminals of the condenser only decreases very slowly along the line 12 indicated in dotted lines in FIG. 3. Whilst the voltage of the condenser decreases weakly between $t_1$ and $t_7$, the current is maintained substantially equal to $i_2$, whilst the flux passes progressively from $\phi_1$ to $\phi_2$. The duration of said period from $t_1$ to $t_7$ may be deduced from the equation:

$$\int^{t_7} U\,dt = \phi_1 - \phi_2$$

wherein U is the voltage applied to the terminals of the coil Ls. There is obtained $$\Delta t = t_7 - t_1 = \frac{2\phi_1}{U}$$

assuming as negligible the variation of U due to the very weak discharge of the condenser.

At the time $t_7$, the magnetic flux of the induction coil has reached the value $\phi_2$, so that the self-induction of said coil again becomes very weak, which would produce a fresh rapid discharge of the condenser between the times $t_7$ and $t_8$ in a direction inverse to that of the discharge which was produced between $t_0$ and $t_1$. At the time $t_8$ the current will have reached the value $i_1$, which will again block the voltage of the condenser at a value substantially constant during a period of time sufficient for the flux to pass from $\phi_2$ to $\phi_1$. As a result there are obtained oscillating and damped discharges in which the duration separating two successive discharges is relatively long in relation to the duration of a single discharge.

In reality, when after the time $t_1$ the value of the current establishes itself at $i_2$, the passage of the current in the discharge circuit is limited by the action of the self-induction coil Ls, but the voltage of the condenser varies relatively rapidly by reason of the charging current delivered by the source of current 1 through the resistance R and the coil L. At the time $t_3$, the voltage of the condenser is equal to zero and, up to this moment it has circulated in the discharge circuit a current equal to $i_2$, so that the flux in the induction coil Ls has varied from $\phi_1$ until it reaches the value $\phi_3$ which is given by:

$$\phi_1 - \phi_3 = \int_{t_1}^{t_3} U\,dt$$

U being the voltage at the terminals of the coil Ls.

At the time $t_3$, the current in the discharge circuit passes from $i_2$ to $i_1$ and maintains itself at this value whilst the voltage at the terminals of the condenser continues to increase along the line 13 of FIG. 3. The current $i_1$ is maintained until the flux has passed from the value $\phi_3$ to $\phi_1$, which is obtained in the time $t_4$.

When neglecting losses, it may be admitted that the voltage at the terminals of the condenser is equal to the voltage of the coil Ls and indicated that the flux again reaches the value $\phi_1$ when the two hatched surfaces A and B are equal. In fact, said surfaces, which are of contrary signs, represent $\int U\,dt$, U being the voltage of the condenser which has been admitted and being substantially equal to the voltage at the terminals of Ls. At this moment the self-induction coil Ls re-assumes its minimum value and when the voltage of the condenser has again reached the disruptive valve of 250 volts, a sudden discharge is reproduced between the electrode 3 and the part 4, said discharge being represented between the time $t_5$ and $t_6$ in FIG. 3. The time $t_6$ corresponds to the time $t_1$ and the cycle repeats itself.

It will be seen that during the whole duration from $t_2$ to $t_4$, the current in the discharge circuit is limited to a very low value by the action of the saturable self-induction coil Ls. It thus results that if a short-circuit is produced as a result of a discharge, for example between the times $t_2$ and $t_4$, the current which can pass into this short-circuit will be limited to a very low value, at the most equal to $i_2$. During the period from $t_2$ to $t_4$, the condenser will continue to be recharged in spite of the presence of the short-circuit, and it is only at the time $t_4$ that a new discharge of high intensity and short duration will be produced, without a sustained arc being capable of being produced. As the majority of short-circuits are due to the deposite of metallic or carbonaceous chips forming a bridge between the electrode and the part, the circuit shown enables these bridges to be destroyed by the force dissipated by the spark or sparks which break up even after the formation of said bridge.

The employment of the rectifier 10 is very advantageous, as during the discharge said rectifier receives no portion of the current and the whole of the current of the condenser passes into a spark between the electrode 3 and the part 4. Whilst the condenser is recharged, the rectifier maintains the voltage between the electrode and the part at a value inferior to that necessary for the maintenance of a discharge by spark. In fact, whatever may be the polarity of the voltage of the condenser between the time $t_2$ and $t_4$, the current passing through the rectifier always has the same direction and it is equal to $i_2$ from $t_2$ to $t_3$, then to $i_1$ from $t_3$ to $t_4$.

FIG. 4 shows another form of construction of a circuit which only differs from that of FIG. 1 by the following points:

(a) The electrostatic accumulator is constituted by an open artificial line 14 instead of the condenser 2;

(b) the rectifier 10 is replaced by a resistance 15.

The functioning of said circuit is practically analogous to that of FIG. 1.

The artificial open line 14 is more advantageous than a condenser, as it permits of obtaining more regular and more intense current impulses.

In this circuit, the polarization of the self-induction coil $Ls$ is obtained by a direct current supplied by an auxiliary source of current 8 and passing through a choke 25 and an adjustable resistance 9. The polarizing current may be adjusted to such a value that, with reference to the characteristic shown in FIG. 2, the vertical left-hand limb of the cycle of hysteresis, which corresponds to the current $i_2$, is slightly more to the right, so as to be substantially in the region of $i_0$. In this manner, from the end of the discharge of the accumulator, which takes place at the time $t_2$ in FIG. 3, the current in the discharge circuit will be zero from $t_2$ to $t_3$, so that no voltage will appear between the electrode 3 and the part 4, as in the first form of construction in which the rectifier 10 constitutes a shunt between the electrode 3 and the part 4. On the contrary, in the case of the resistance 15, a voltage appears between the electrode 3 and the part 4 from the time $t_3$, which was not the case in the first form of construction.

In order to simplify the form of construction according to FIG. 4, it is possible to omit the polarization of the coil $Ls$, as the resistance 15 has no unidirectional effect, and the fact that the currents $i_1$ and $i_2$ are of different signs and do not play a large part. It is meanwhile evident that with a polarization according to the above indications, the fact of being able to eliminate practically the whole current during the first portion of the interval separating two successive discharges, that is to say from $t_2$ to $t_3$, allows of also increasing the property of the circuit by opposing the formation of continuous arcs.

When the coil $Ls$ has no polarization, the representation of the voltage at the terminals of the artificial line 14 is practically similar to that given in FIG. 3, for the condenser 2, but the discharge is then shown by the broken line instead of a sinusoid between $t_0$ and $t_1$. Then, at the point $t_4$, the flux in the self-induction coil $Ls$ again reaches $\phi_1$, so that it no longer limits the current to the value $i_1$ and that, consequently, a much more intense current can pass through the resistance 13. As a result a diminution of current becomes available for recharging the artificial line 14, so that the recharge takes place more slowly between $t_4$ and $t_5$ that that shown in FIG. 3. However, it is advantageous that the ohmic value of the resistance 15 should be higher than that of the machining spark which is produced between the electrode 3 and the part 4.

The circuits which have been described constitute examples of construction, but it will be understood that it is possible to apply numerous modifications to these circuits and that, when the electrode and the part are separated from one another by a non-insulating liquid, for example by an electrolyte, the resistance 15 may be omitted. The electrostatic accumulator may also be constituted by a circuit known as "Guillemin," which is composed by a condenser connected in series with two parallel oscillating circuits and which has practically the same advantages as the open artificial line 14.

I claim:

1. An electric circuit for a device for machining a part of a workpiece by sparks, comprising in combination, an electrostatic accumulator, a charging circuit connecting said accumulator to a source of direct current, a discharge circuit connecting said accumulator to an electrode-tool and the part of the workpiece to be machined, a saturable self-induction coil in said discharge circuit, said discharge circuit having a self-induction sufficient relative to its ohmic resistance, so that a discharge of said accumulator will have an oscillating character when said induction coil is saturated, whereby at the moment of said discharge a reversal of the voltage of said accumulator is produced, said reversal having the effect of bringing said coil into its unsaturated range, and said coil then acting as a circuit breaker, the following discharge being struck by the normal switching action of the assembly formed by said electrode, said part to be machined, and the dielectric which separates said electrode and said part.

2. A circuit according to claim 1, wherein said electrode and said part to be machined are connected by a rectifying element, the polarity of said rectifying element being such that said element is a conductor when said electrode is positive relatively to said part.

3. A circuit according to claim 1, comprising a resistance connecting said electrode and said part to be machined, the ohmic value of said resistance being higher than that of said spark which is produced between said electrode and said part during the discharge of said electrostatic accumulator.

4. A circuit according to claim 1, wherein said self-induction saturable coil has a single winding traversed, on the one hand, by the discharge current of said electrostatic accumulator and, on the other hand, by a direct current of polarization supplied by an auxiliary source of current.

5. The circuit according to claim 1, wherein said coil is provided with a core, and a polarization means adapted to act on said core.

6. The circuit according to claim 5, wherein said polarization means is adjustable.

References Cited in the file of this patent

UNITED STATES PATENTS

| 2,235,385 | Rava | Mar. 18, 1941 |
| 2,440,892 | Callender | May 4, 1948 |
| 2,730,602 | Porterfield | Jan. 10, 1956 |
| 2,756,316 | Teubner | July 24, 1956 |
| 2,773,168 | Williams | Dec. 4, 1956 |
| 2,798,934 | Bruma | July 9, 1957 |